Feb. 21, 1939.          R. R. APPLEGATE          2,148,182
                         WELDING ELECTRODE
                         Filed Oct. 4, 1937
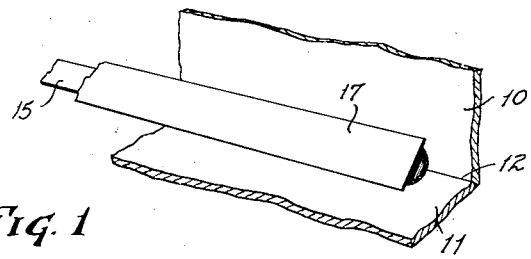
Fig. 1
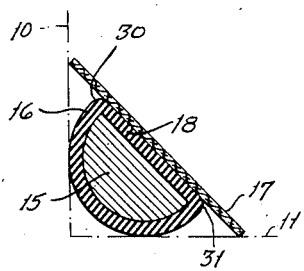   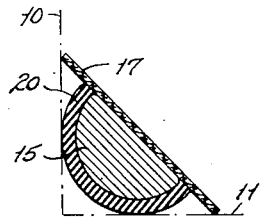   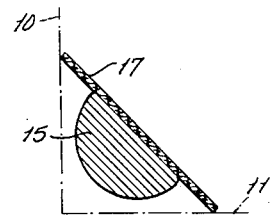
Fig. 2          Fig. 3          Fig. 4
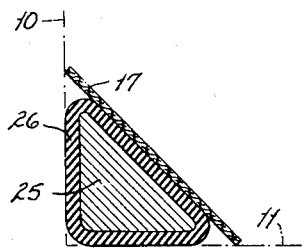   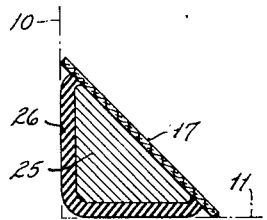   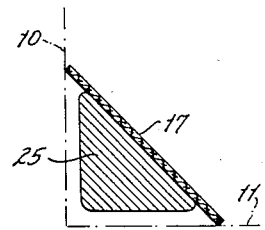
Fig. 5          Fig. 6          Fig. 7
INVENTOR.
ROBERT R. APPLEGATE
BY Bates, Goldrick, & Teare
ATTORNEYS Patented Feb. 21, 1939

2,148,182

UNITED STATES PATENT OFFICE 2,148,182

WELDING ELECTRODE

Robert R. Applegate, Shaker Heights, Ohio

Application October 4, 1937, Serial No. 167,201

5 Claims. (Cl. 219—8)

This invention relates to electrodes that are used in electric welding and has particular reference to those which are used for welding fillets in the corners of castings or other metallic parts. The present application is a continuation in part of my co-pending application, Serial No. 145,999, filed June 2, 1937, which in turn is continuation in part of the application on which Letters Patent of the United States No. 2,083,309 were issued June 8, 1937.

One of the difficulties in welding a fillet in the corner of a metallic article is that the metal has a tendency to run down and to settle on one side of the corner more than on the opposite side. Many efforts have been made to correct this difficulty and one of such efforts has included a coating which encloses the rod. I have found however that a coating embracing the rod is not sufficient in itself to accomplish the result due, perhaps, to the fact that the resulting arc is not shielded but is allowed to flow outwardly and carry the molten metal with it.

An object of my invention therefore is to make an electrode which will operate satisfactorily to form a fillet without entailing any flashing of the metal from the article and without allowing the metal to accumulate in an uneven manner on one side of the joint.

I carry out my invention by utilizing an electrode that is shaped to fit snugly within a corner where the weld is intended to occur and by further utilizing a shield that operates to direct the arc, or to confine it to a corner between two parts that are to be welded together. I have found that an electrode so made will cause the metal to flow evenly and without splatter and that it will accomplish the desired result in a simple and expeditious manner.

Referring now to the drawing, Fig. 1 is a perspective view of two metallic plates which have an electrode made in accordance with my invention laid thereon and adjacent the joint; Fig. 2 is a transverse section taken through the electrode illustrated in Fig. 1; Figs. 3 and 4 are similar sectional views showing modified forms of my invention in which the electrode has a half round face, and Figs. 5, 6 and 7 are cross sectional views through modified forms of electrodes wherein the metal has a triangular face.

In Fig. 1, the two parts to be welded are indicated at 10 and 11 as having a line contact indicated at 12. To make a fillet between the two plates adjacent the corner, or the line of engagement, I lay an electrode within the corner and apply a current of electricity to the fillet in the customary way. The electrode in Fig. 1 has a half round shape and is indicated at 15. In this form, the electrode is coated on all sides thereof with a coating 16, and the curved surface of the coating is supported by the plates 10 and 11.

To confine or direct the arc so as to avoid splatter of the metal and so as to maintain an even distribution of it on the surfaces or plates 10 and 11, I utilize a strip of organic material, such as a fabric 17 which is attached to the coating that covers the flat surface 18. The strip 17 may overhang the edges although if desired it may terminate adjacent the edges 30 and 31.

In the modification of Fig. 3, the coating 20 covers only the curved surface as a result of which, the strip 17 is attached directly to the flat face of the electrode.

In the modification of Fig. 4 the coating is eliminated and the strip 17 is attached directly to the flat face of the electrode. In this modification, the overhanging edges of the strip 17 serve to support the electrode in welding position with reference to the surfaces 10 and 11, and in such position, the strip is sufficiently rigid to accomplish the desired purpose.

In Figs. 5, 6 and 7, the electrode is irregular in cross-section and the coating of the strip is so arranged that the electrode fits snugly against the faces of the parts to be welded, while the strip 17 extends diagonally between the parts and along the hypotenuse face of the electrode.

In Fig. 5, the electrode 25 has a coating 26 completely around it and has the strip 17 attached to the coating which, as previously stated, is affixed to the hypotenuse face of the electrode.

In Fig. 6, the coating 26 extends only on the two faces which contact the surfaces to be welded, while the strip 17 is attached directly to the third face of the electrode.

In Fig. 7, the coating is eliminated and the strip 17 is attached directly to the hypotenuse face of the electrode. In this form, as that in Fig. 4, the strip overhangs the edges of the electrode and has sufficient rigidity to hold it in welding position.

An important advantage of my invention is the fact that the strip of organic material shields the arc and confines it to the region of the weld. In this way, splatter of the metal is avoided, and the weld metal is uniformly distributed in the corner of the joint.

I claim:

1. An electrode comprising a half-section of metal, having a coating on all but one surface thereof and having a strip of organic material attached to the bare surface thereof.

2. An electrode comprising a half-section of metal, having a plurality of faces and having a strip of organic material attached directly to one of such faces.

3. An electrode having a triangular-shape and having a coating on all faces thereof and having a strip of organic material attached to one of the surfaces of the coating.

4. An electrode comprising a triangular shaped section of metal, having a coating on two faces thereof, and having a strip of organic material attached to the third face thereof.

5. An electrode comprising a triangular shaped strip of metal, having two faces thereof bare, and having a strip of organic material attached to the third face.

ROBERT R. APPLEGATE.